Patented July 9, 1940

2,207,611

UNITED STATES PATENT OFFICE 2,207,611

PURIFICATION OF ALKYL CHLORIDES AND FORMATION OF ESTERS

Gerald H. Coleman and Garnett V. Moore, Midland, Mich., assignors to The Dow Chemical Company, Midland, Mich., a corporation of Michigan No Drawing. Application August 9, 1935, Serial No. 35,514

12 Claims. (Cl. 260—474)

This invention concerns an improved method of purifying an alkyl chloride containing a closely related and difficultly separable chloro-olefine having the general formula

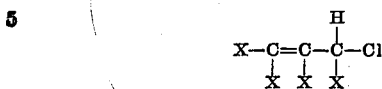

wherein each X represents hydrogen or a hydrocarbon radical. It particularly concerns the purification of isobutyl chloride which is intermixed with a chloro-isobutylene, and also certain new 2-methyl-allyl esters obtained as products of the purification treatment.

It is known that in the manufacture of an alkyl chloride by vapor phase chlorination of a saturated aliphatic hydrocarbon, a difficultly separable chloro-olefine boiling at approximately the same temperature as the alkyl chloride product is often formed. For instance, in the vapor phase chlorination of isobutane, a complex mixture is formed which may be distilled to separate therefrom a mixture of isobutyl chloride, tertiary butyl chloride, and chloro-isobutylene, but said compounds, particularly the isobutyl chloride and chloro-isobutylene, boil at nearly the same temperature and cannot readily be separated by distillation. However, the tertiary butyl chloride in such mixture may be selectively hydrolyzed and the tertiary butyl alcohol product separated by a method set forth in U. S. Patent No. 1,984,-725, leaving a mixture of isobutyl chloride and chloro-isobutylene. Although the isobutyl chloride may then be purified by further chlorination of the chloro-isobutylene followed by distillation, such procedure is wasteful in that it involves conversion of the chloro-isobutylene into polychlorinated compounds of little or no value.

An object of the present invention is to provide a method whereby the chloro-isobutylene contained in admixture with isobutyl chloride may be selectively reacted to form a valuable ester product which may be readily separated from the isobutyl chloride. Other objects will be apparent from the following description of the invention.

We have discovered that the particular chloro-isobutylene present in the above mixture is 2-methyl-allyl chloride,

and that it may be selectively reacted with an alkali metal salt of a carboxylic acid to form an ester which may be separated from the isobutyl chloride by distillation. We have further found that by employing salts of acids containing more than two carbon atoms as reactants in such purification process, an entire series of new 2-methyl-allyl esters, having the general formula

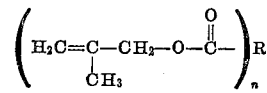

wherein R is an organic radical of a carboxylic acid containing more than two carbon atoms and $n$ is the number of carboxyl groups in said acid, may be produced. Such new esters are useful as organic solvents, particularly for cellulose acetate and nitrocellulose compositions, and may also be employed as reactants for the production of other organic products, e. g. a dichloro-isobutyl ester of a carboxylic acid.

Although our invention is particularly well adapted to the purification of isobutyl chloride, the principle of the invention may be applied more generally. For instance, we have found that any impure primary or secondary alkyl chloride containing as impurity a chloro-olefine having the general formula

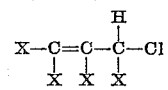

wherein each X represents hydrogen or a hydrocarbon radical, may be purified by selective reaction of such chloro-olefine with an alkali metal salt of a carboxylic acid and subsequent separation of the resultant ester product. Thus, the invention may be applied to remove allyl chloride from an admixture thereof with iso- or normal-propyl chloride; to remove a 1-chloro-amylene-2 from admixture with a primary or secondary amyl chloride, etc.

The invention may also be applied in separating such chloro-olefine from an admixture thereof with tertiary- and primary- or secondary-alkyl chlorides, but during reaction the tertiary alkyl chloride is usually converted to the corresponding olefine which is separated during distillation of the reacted mixture. Such application of the invention is frequently advantageous, since it results in the simultaneous removal of two closely related and difficultly separable compounds, i. e. a chloro-olefine and a tertiary alkyl chloride, from the primary or secondary alkyl chloride product. The olefine produced by such treatment may be employed as a reactant in reactions of the Friedel-Craft type and for such purpose is usually the equivalent of the tertiary alkyl chloride from which it was produced.

To the accomplishment of the foregoing and related ends, the invention consists in the method and new compounds hereinafter fully described and particularly pointed out in the claims.

In removing 2-methyl-allyl chloride from isobutyl chloride by our method, a mixture of said compounds is heated in a closed reactor to a reaction temperature between 125° and 225° C., preferably between 150° and 200° C., with an alkali metal salt of a carboxylic acid, e. g. a sodium or potassium salt of formic, acetic, butyric, benzoic, naphthoic, cinnamic, or salicylic acid. The salt reactant is preferably employed in proportion at least chemically equivalent to the 2-methyl-allyl chloride.

The reaction proceeds most smoothly and rapidly when carried out in a copper or copper-lined reactor and in the presence of a copper compound, such as cupric acetate, cupric chloride, cuprous oxide, ammonia-copper sulphate, etc., which is soluble in the reaction mixture, but may be carried out, though less satisfactorily, in a reactor having an inner surface of iron, nickel, or glass, etc., and in the presence or absence of such copper-containing catalyst. However, regardless of the material of the reactor, such catalyst is preferably employed, since it is effective in promoting rapid and complete reaction. The soluble copper compound employed as catalyst may be added as such to the reaction mixture, but when the reaction is carried out in a copper reactor, sufficient copper compound usually dissolves to form such catalyst in situ.

To promote such dissolving of copper and thereby speed up the desired reaction an auxiliary agent capable of attacking and dissolving copper may advantageously be added to the reaction mixture. Among the various auxiliary agents which may be added for such purpose are ammonia; ammonium and amine salts such as ammonium chloride, ammonium acetate, diethylamine hydrochloride, cyclohexylamine hydrochloride, etc.; organic nitrogen bases such as methyl amine, diethyl amine, aniline, toluidine, pyridine, quinoline, dicyclohexyl amine, etc.; and acids such as acetic, oxalic, hydrochloric, and sulphuric acids. A mere trace of a copper-containing catalyst is usually sufficient to promote fairly rapid reaction, but a larger proportion may be employed if desired. When the catalyst is to be formed in situ by addition of an agent capable of dissolving copper, it is desirable, of course, to employ only a small portion of such agent, e. g. 0.1 mole per mole of 2-methyl-allyl chloride, so as to avoid excessive attack on the copper reactor. The reaction is usually complete after from 1 to 6 hours of heating under the preferred conditions just stated.

The reactor is then cooled and the charge removed. The alkali metal chloride formed by the reaction is separated from the reacted mixture, e. g. by filtration or washing with water, after which said mixture is distilled to separate the isobutyl chloride and 2-methyl-allyl ester products. Instead of separating the products, the mixture of isobutyl chloride and 2-methyl-allyl ester may be used directly in reactions for the production of derivatives of the ester, e. g. the dichloro-ester, in which case the isobutyl chloride serves as a reaction medium and may thereafter be separated from the reacted mixture. When tertiary butyl chloride is also present in the mixture of isobutyl chloride and 2-methyl-allyl chloride, the 2-methyl-allyl chloride reacts as described to form an ester, while the tertiary butyl chloride is largely decomposed to form isobutylene, which can be readily separated from the other products by distillation. The invention, accordingly, provides a method of producing isobutyl chloride, isobutylene, and an 2-methyl-allyl ester simultaneously and each in substantially pure form from a difficultly separable mixture of isobutyl chloride, tertiary butyl chloride, and 2-methyl-allyl chloride.

The following examples illustrate a number of ways in which the principle of our invention has been applied, but are not to be construed as limiting the invention.

EXAMPLE 1

A mixture of 568.5 grams crude isobutyl chloride, containing 16 per cent by weight of 2-methyl-allyl chloride, and 90 grams anhydrous sodium acetate was heated in a rotating steel bomb at a temperature of about 215° C. for 2 hours. The bomb was then cooled, the contents discharged, and the reacted mixture was washed free of inorganic chlorides with water. The mixture was then fractionally distilled, whereby 30.8 grams of 2-methyl-allyl acetate of boiling point 123°–125° C. at atmospheric pressure was separated, while 512 grams of isobutyl chloride containing approximately 7 per cent by weight of 2-methyl-allyl chloride was recovered.

EXAMPLE 2

A mixture of 572 grams crude isobutyl chloride, containing 16 per cent by weight of 2-methyl-allyl chloride, 106 grams sodium propionate, and 1.4 grams cuprous oxide was heated in a rotating steel bomb at 175° C. for 3 hours. The bomb was then cooled, discharged, and the reaction products were separated as in Example 1. There was obtained 419 grams of purified isobutyl chloride, containing less than 1 per cent of 2-methyl-allyl chloride, and 90 grams of 2-methyl-allyl propionate. The latter is a new compound and is described in the table of new compounds presented in Example 8.

EXAMPLE 3

A mixture of 267 grams isobutyl chloride, 267 grams 2-methyl-allyl chloride, and 266 grams anhydrous sodium acetate was heated in a rotating copper bomb to 175° C. for 3 hours. The bomb was then cooled, discharged, and the reaction products separated as in Example 1. There was obtained 274 grams of 2-methyl-allyl acetate and 231 grams of substantially pure isobutyl chloride containing 0.5 per cent by weight of 2-methyl-allyl chloride.

EXAMPLE 4

A mixture of 568.5 grams crude isobutyl chloride, containing 16 per cent by weight of 2-methyl-allyl chloride, and 90 grams anhydrous sodium acetate was heated in a rotating copper bomb to 200° C. for 1 hour. The bomb was then cooled, the charge removed, and the products separated as in Example 1. There was obtained 71 grams 2-methyl-allyl acetate and 388 grams of substantially pure isobutyl chloride containing only 0.4 per cent of 2-methyl-allyl chloride.

EXAMPLE 5

A mixture of 568.5 grams crude isobutyl chloride, containing 16 per cent of 2-methyl-allyl chloride, 90 grams anhydrous sodium acetate, and 0.6 gram glacial acetic acid was heated to 150° C. in a rotating copper bomb for 6 hours. The bomb was then discharged and the products separated as in Example 1. There was obtained 52.3 grams of 2-methyl-allyl acetate and 457 grams of purified isobutyl chloride containing only 1.3 per cent of 2-methyl-allyl chloride.

Example 6

A mixture of 513 grams impure isopropyl chloride, containing 15 per cent by weight of allyl chloride, 90 grams anhydrous sodium acetate, and 0.8 gram ammonium acetate was heated to 150° C. in a rotating copper bomb for 6 hours. The bomb was cooled, discharged, and the products were separated by procedure similar to that described in Example 1. There was obtained 51 grams of allyl acetate and 372 grams of substantially pure isopropyl chloride containing less than 1 per cent of allyl chloride.

Example 7

A mixture of 513 grams impure n-propyl chloride, containing 15 per cent by weight of allyl chloride, 90 grams anhydrous sodium acetate, and 0.8 gram ammonium acetate was heated to 150° C. in a rotating copper bomb for 6 hours. The bomb was then cooled, discharged, and the products separated as in Example 1. There was obtained 69 grams of allyl acetate and 384 grams of purified n-propyl chloride containing only 1.1 per cent of allyl chloride.

Example 8

A series of experiments were carried out for the double purpose of purifying isobutyl chloride and at the same time producing a number of new 2-methyl-allyl esters. In each experiment a mixture of isobutyl chloride, 2-methyl-allyl chloride, and an alkali metal salt of a carboxylic acid containing more than two carbon atoms was heated at about 175° C. in a rotating copper bomb for 3 hours. The bomb was then cooled, discharged, and the purified isobutyl chloride and new 2-methyl-allyl ester products separated as in Example 1. The sodium salts of propionic, butyric, stearic, benzoic, and salicylic acids were employed as reactants in the experiments. The following table describes the new esters produced by the selective reaction of said salts with 2-methyl-allyl chloride.

Table

| Ester product | Boiling point °C. | Pressure | Specific gravity 20°/4° C. | Index of refraction $n_D^{20}$ |
|---|---|---|---|---|
| $H_2C=C-CH_2-O-\overset{O}{\underset{}{C}}-C_2H_5$ <br> $\quad\ \ |$ <br> $\quad\ \ CH_3$ <br> 2-methyl-allyl propionate | 140-2 | Atmos. | 0.910 | 1.419 |
| $H_2C=C-CH_2-O-\overset{O}{\underset{}{C}}-C_3H_7$ <br> $\quad\ \ |$ <br> $\quad\ \ CH_3$ <br> 2-methyl-allyl butyrate | 80-2 | 50 mm. | 0.897 | 1.420 |
| $H_2C=C-CH_2-O-\overset{O}{\underset{}{C}}-C_{17}H_{35}$ <br> $\quad\ \ |$ <br> $\quad\ \ CH_3$ <br> 2-methyl-allyl stearate | 190-215 | 5 mm. | 0.868 | 1.450 |
| $H_2C=C-CH_2-O-\overset{O}{\underset{}{C}}-C_6H_5$ <br> $\quad\ \ |$ <br> $\quad\ \ CH_3$ <br> 2-methyl-allyl benzoate | 125-6 | 20 mm. | 1.047 | 1.517 |
| $H_2C=C-CH_2-O-\overset{O}{\underset{}{C}}-C_6H_4-OH$ <br> $\quad\ \ |$ <br> $\quad\ \ CH_3$ <br> 2-methyl-allyl salicylate | 132-5 | 15 mm. | 1.108 | 1.525 |

Example 9

In a series of additional experiments, isobutyl chloride containing approximately 16 per cent by weight of 2-methyl-allyl chloride was rendered relatively pure by heating the same at 175° C. with sodium propionate under each of the following conditions: (1) in a glass-lined bomb without a catalyst, (2) in a glass-lined bomb and in the presence of cuprous oxide as catalyst, (3) in a nickel bomb without a catalyst, and (4) in a nickel bomb using cuprous oxide as catalyst. The reactions proceeded smoothly but slowly in the absence of a copper-containing catalyst, that in glass being only about 16.5 per cent complete after 3 hours of heating and that in nickel being 54 per cent complete after the same period of heating. Each reaction carried out in the presence of cuprous oxide was more than 85 per cent complete after 3 hours of heating. 2-methyl-allyl propionate was produced in each of the experiments.

An alkali metal salt of any carboxylic acid, e. g. oxalic acid, citric acid, cinnamic acid, etc., may be employed as a reactant in purifying a primary or secondary alkyl chloride containing a closely related chloro-olefine by the present method. In all instances, such salt reacts selectively with the chloro-olefine to produce the corresponding ester, which may be separated from the unreacted alkyl chloride by distillation. For instance, by employing sodium citrate as a reactant in purifying isobutyl chloride which contains 2-methyl-allyl chloride, tri-isobutenyl citrate may be produced; by employing sodium oxalate as the salt reactant, di-2-methyl-allyl oxalate may be formed; etc.

Although sodium salts of carboxylic acids were employed as reactants in the foregoing examples, potassium or other alkali metal salts of such acids may likewise be employed and at least in some cases are more reactive with chloro-olefines than are the sodium salts.

Other modes of applying the principle of our invention may be employed instead of those explained, change being made as regards the method and compounds herein disclosed, provided the steps or compounds stated by any of the following claims or the equivalent of such stated steps or compounds be employed.

We therefore particularly point out and distinctly claim as our invention:

1. The method which comprises selectively reacting an alkali metal salt of a carboxylic acid with a chloro-olefine, having the general formula

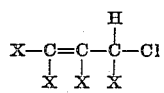

wherein each X represents a member of the group consisting of hydrogen and hydrocarbon radicals, in the presence of an alkyl chloride selected from the class consisting of primary and secondary alkyl chlorides, said chloro-olefine and alkyl chloride being compounds which tend to distill together.

2. The method which comprises treating a mixture of a chloro-olefine, having the general formula

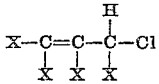

wherein each X represents a member of the group consisting of hydrogen and hydrocarbon radicals, and an alkyl chloride selected from the class consisting of primary and secondary alkyl chlorides and containing the same number of carbon atoms as are in said chloro-olefine with an alkali metal salt of a carboxylic acid, and heating the mixture under pressure to a reaction temperature between about 125° and about 225° C.

3. The method which comprises adding to a mixture of a chloro-olefine, having the general formula

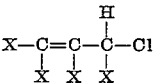

wherein each X represents a member of the group consisting of hydrogen and hydrocarbon radicals, and an alkyl chloride selected from the class consisting of primary and secondary alkyl chlorides and containing the same number of carbon atoms as are in said chloro-olefine, at least one chemical equivalent of an alkali metal salt of a carboxylic acid per mole of said chloro-olefine, and heating the mixture under pressure in the presence of a soluble copper compound to a reaction temperature between about 125° and about 225° C.

4. The method which comprises adding to a mixture of a chloro-olefine, having the general formula

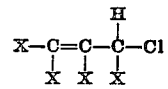

wherein each X represents a member of the group consisting of hydrogen and hydrocarbon radicals, and an alkyl chloride selected from the class consisting of primary and secondary alkyl chlorides and containing the same number of carbon atoms as are in said chloro-olefine, at least one chemical equivalent of an alkali metal salt of a carboxylic acid per mole of said chloro-olefine, heating the mixture under pressure in contact with copper surfaces to a reaction temperature between about 150° and about 200° C., and thereafter distilling the mixture to separate the resultant olefinic ester and purified alkyl chloride products.

5. The method which comprises adding to a mixture of a chloro-olefine, having the general formula

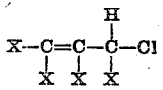

wherein each X represents a member of the group consisting of hydrogen and hydrocarbon radicals, and an alkyl chloride selected from the class consisting of primary and secondary alkyl chlorides and containing the same number of carbon atoms as are in said chloro-olefine, at least one chemical equivalent of an alkali metal salt of a carboxylic acid per mole of said chloro-olefine, heating the mixture under pressure to a reaction temperature between 150° and 200° C. in the presence of a soluble copper compound and in contact with copper surfaces, and thereafter distilling the mixture to separate therefrom the resultant olefinic ester and purified alkyl chloride products.

6. The method which comprises selectively reacting an alkali metal salt of a carboxylic acid with 2-methyl-allyl chloride at a temperature between about 125° and about 225° C. in the presence of isobutyl chloride.

7. The method which comprises adding to a mixture of 2-methyl-allyl chloride and isobutyl chloride at least one chemical equivalent of an alkali metal salt of a carboxylic acid per mole of the 2-methyl-allyl chloride, heating the mixture under pressure to a reaction temperature between 150° and 200° C. in contact with copper surfaces, and thereafter distilling the mixture to separate therefrom the resultant 2-methyl-allyl ester and purified isobutyl chloride products.

8. The method which comprises adding to a mixture of 2-methyl-allyl chloride and isobutyl chloride at least one mole of alkali metal salt of a mono-carboxylic acid per mole of 2-methyl-allyl chloride, heating the mixture under pressure in the presence of a soluble copper compound and in contact with copper surfaces to a reaction temperature between 150° and 200° C., and thereafter distilling the mixture to separate therefrom the resultant 2-methyl-allyl ester and purified isobutyl chloride products.

9. The method which comprises adding to a mixture of 2-methyl-allyl chloride and isobutyl chloride at least one mole of alkali metal acetate per mole of 2-methyl-allyl chloride, heating the mixture under pressure to a reaction temperature between 150° and 200° C. in the presence of a soluble copper compound and in contact with copper surfaces, and thereafter distilling the mixture to separate therefrom the resultant 2-methyl-allyl acetate and purified isobutyl chloride products.

10. The method which comprises adding to a mixture of 2-methyl-allyl chloride, isobutyl chloride, and tertiary butyl chloride at least one chemical equivalent of an alkali metal salt of a carboxylic acid per mole of 2-methyl-allyl chloride, heating the mixture under pressure to a reaction temperature between about 125° and about 225° C., and thereafter distilling the mixture to separate therefrom the resultant isobutylene, 2-methyl-allyl ester, and purified isobutyl chloride products.

11. The method which comprises adding to a mixture of 2-methyl-allyl chloride and isobutyl chloride an alkali metal salt of a carboxylic acid containing more than two carbon atoms, heating the resultant mixture under pressure in contact with copper surfaces to a reaction temperature between about 150° and about 200° C., and thereafter distilling the mixture to separate therefrom the resultant 2-methyl-allyl ester and purified isobutyl chloride products.

12. 2-methyl-allyl salicylate, boiling at approximately 132°–135° C. under 15 mm. pressure and having a specific gravity of approximately 1.108 at 20°/4° C.

GERALD H. COLEMAN.
GARNETT V. MOORE.